(12) United States Patent
Yamagishi et al.

(10) Patent No.: US 11,889,148 B2
(45) Date of Patent: Jan. 30, 2024

(54) ENGAGEMENT ESTIMATION APPARATUS, ENGAGEMENT ESTIMATION METHOD AND PROGRAM

(71) Applicant: Nippon Telegraph and Telephone Corporation, Tokyo (JP)

(72) Inventors: Kazuhisa Yamagishi, Musashino (JP); Pierre Lebreton, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 269 days.

(21) Appl. No.: 17/429,519

(22) PCT Filed: Feb. 7, 2020

(86) PCT No.: PCT/JP2020/004937
§ 371 (c)(1),
(2) Date: Aug. 9, 2021

(87) PCT Pub. No.: WO2020/170869
PCT Pub. Date: Aug. 27, 2020

(65) Prior Publication Data
US 2022/0109910 A1 Apr. 7, 2022

(30) Foreign Application Priority Data
Feb. 20, 2019 (JP) .................. 2019-028462

(51) Int. Cl.
*H04N 21/44* (2011.01)
*H04N 21/25* (2011.01)
(Continued)

(52) U.S. Cl.
CPC ... *H04N 21/44204* (2013.01); *H04N 21/2383* (2013.01); *H04N 21/2625* (2013.01); *H04N 21/647* (2013.01)

(58) Field of Classification Search
CPC ............ H04N 21/44204; H04N 21/25; H04N 21/2625; H04N 21/647
(Continued)

(56) References Cited

U.S. PATENT DOCUMENTS

2010/0122308 A1 5/2010 Hattori
2017/0086090 A1* 3/2017 Sharma ................. H04L 65/403

FOREIGN PATENT DOCUMENTS

JP 2010114723 5/2010
JP 2014042124 3/2014

OTHER PUBLICATIONS

[No Author Listed], "Parametric bitstream-based quality assessment of progressive download and adaptive audio visual streaming services over reliable transport," Recommendation ITU-T p. 1203, Oct. 2017, 22 pages.
(Continued)

*Primary Examiner* — Jeffery A Williams
(74) *Attorney, Agent, or Firm* — Fish & Richardson P.C.

(57) ABSTRACT

An engagement estimation apparatus includes an acquisition unit configured to acquire, for each measurement section after an instruction of a start of a view of an video delivered through a network, any of a parameter related to a coding quality of the video in the measurement section and a parameter related to a viewing state of the video in the measurement section, and an estimation unit configured to calculate an estimation value of an index for evaluation of engagement for each measurement section based on a parameter acquired by the acquisition unit in the measurement section. Thus, it is possible to estimate engagement based on parameters that can be observed in a terminal.

12 Claims, 5 Drawing Sheets

(51) Int. Cl.
     *H04N 21/64*    (2011.01)
     *H04N 21/442*   (2011.01)
     *H04N 21/2383*  (2011.01)
     *H04N 21/262*   (2011.01)
     *H04N 21/647*   (2011.01)

(58) Field of Classification Search
     USPC .................................................. 375/240.26
     See application file for complete search history.

(56) References Cited

OTHER PUBLICATIONS

Takahashi et al., "A Study on Viewing Time of Adaptive Bitrate Video Streaming," IEICE Communication Society Conference, Sep. 11, 2018, p. 198, 3 pages (with English translation).

Yamagishi et al., "Parametric Quality-Estimation Model for Adaptive-Bitrate-Streaming Services," IEEE Transactions on Multimedia, Jul. 2017, 19(7):1545-1557.

* cited by examiner

| VIDEO ELAPSED TIME (SECOND) | VIDEO VIEWING TIME (SECOND) | VIEW EXIT RATE (%) AFTER FIVE SECONDS OF INITIAL LOADING DELAY | VIEW EXIT RATE (%) WITH CERTAIN CODING QUALITY | ACCEPTABLE RATE (%) | VIEW EXIT RATE (%) |
| --- | --- | --- | --- | --- | --- |
| 0 | 5 | 10 |  | 90 | 10 |
| 1 | 6 | 0 | 0.01 | 89.991 | 10.009 |
| 2 | 7 | 0 | 0.01 | 89.982 | 10.018 |
| 3 | 8 | 0 | 0.01 | 89.973 | 10.027 |
| 4 | 9 | 0 | 0.01 | 89.964 | 10.036 |
| 5 | 10 | 0 | 0.01 | 89.955 | 10.045 |
| 6 | 11 | 0 | 0.01 | 89.946 | 10.054 |
| 7 | 12 | 0 | 0.01 | 89.937 | 10.063 |
| 8 | 13 | 0 | 0.01 | 89.928 | 10.072 |
| 9 | 14 | 0 | 0.01 | 89.919 | 10.081 |
| 10 | 15 | 0 | 0.01 | 89.910 | 10.090 |

Fig. 4

| VIDEO ELAPSED TIME (SECOND) | VIDEO VIEWING TIME (SECOND) | VIEW EXIT RATE (%) AFTER FIVE SECONDS OF INITIAL LOADING DELAY | VIEW EXIT RATE (%) WITH CERTAIN CODING QUALITY | VIEW EXIT RATE (%) OF STALLING LENGTH OF 20 SECONDS | ACCEPTABLE RATE (%) | VIEW EXIT RATE (%) |
|---|---|---|---|---|---|---|
| 0 | 5 | 10 | | | 90 | 10 |
| 1 | 6 | 0 | 0.01 | | 89.991 | 10.009 |
| 2 | 7 | 0 | 0.01 | | 89.982 | 10.018 |
| 3 | 8 | 0 | 0.01 | | 89.973 | 10.027 |
| 4 | 9 | 0 | 0.01 | | 89.964 | 10.036 |
| 5 | 10 | 0 | 0.01 | | 89.955 | 10.045 |
| STALLING | 30 | | | 10 | 80.960 | 19.040 |
| 6 | 31 | 0 | 0.01 | | 80.951 | 19.049 |
| 7 | 32 | 0 | 0.01 | | 80.943 | 19.057 |
| 8 | 33 | 0 | 0.01 | | 80.935 | 19.065 |
| 9 | 34 | 0 | 0.01 | | 80.927 | 19.073 |
| 10 | 35 | 0 | 0.01 | | 80.919 | 19.081 |

Fig. 5

ENGAGEMENT ESTIMATION APPARATUS, ENGAGEMENT ESTIMATION METHOD AND PROGRAM

CROSS-REFERENCE TO RELATED APPLICATIONS

This application is a National Stage application under 35 U.S.C. § 371 of International Application No. PCT/JP2020/004937, having an International Filing Date of Feb. 7, 2020, which claims priority to Japanese Application Serial No. 2019-028462, filed on Feb. 20, 2019. The disclosure of the prior application is considered part of the disclosure of this application, and is incorporated in its entirety into this application.

TECHNICAL FIELD

The present invention relates to an engagement estimation apparatus, an engagement estimation method and a program.

BACKGROUND ART

Communication services (voice communication, video communication, Web, IoT, and the like) that transmit video, sound (hereinafter including voice), text, and the like between terminals or between servers and terminals via the Internet are widespread.

The Internet is a network where communication quality is not always guaranteed, and therefore, when communicating with audio and video media, the quality that viewers perceive for audio and video media is degraded due to bit rate decrease due to narrow line bandwidth between the viewer's terminal and the network, packet loss due to line congestion, delay in packet transmission, and packet retransmission.

Specifically, in adaptive bit rate video delivery, in which the bit rate of audio and video media is changed in accordance with the network's throughput state, a reduction in sound and image quality due to a decrease in throughput, and an initial loading delay or stalling due to the buffering process that occurs because a predetermined amount of data has not been accumulated in the buffer of the receiving terminal occur.

The bit rate degradation, the initial loading delay and the stalling affect not only the quality that users experience, but also the engagement (view duration, view acceptance, stop/exit, view cancellation).

Therefore, in order to confirm that the video distributor is providing the above video communication services with good quality and engagement, it is important to be able to measure the quality and engagement of audio-visuals experienced by viewers during the provision of the service and to monitor the high quality and engagement of the audio-visuals provided to the viewers.

Therefore, there is a need for quality and engagement estimation techniques that can adequately indicate the audio-visual quality and engagement that viewers experience.

One example of related-art objective quality assessments include ITU-T recommendation P.1203 disclosed in NPTL 1 and the technique disclosed in NPTL 2. The present technique estimates the quality using quality parameters such as video resolution, frame rate, bit rate, initial loading delay, and stalling length from packets received at a reception terminal (such as a smartphone and a STB (Set-Top Box)).

CITATION LIST

Non Patent Literature

NPL 1: Parametric bitstream-based quality assessment of progressive download and adaptive audiovisual streaming services over reliable transport, ITU-T P.1203

NPL 2: P K. Yamagishi and T. Hayashi, "Parametric Quality-Estimation Model for Adaptive-Bitrate Streaming Services," IEEE Transactions on Multimedia, 2017. DOI: 10.1109/TMM.2017.2669859.

SUMMARY OF THE INVENTION

Technical Problem

However, if an video distributor is going to monitor engagement (view duration, view acceptance and stop/exit; hereinafter the view exit is described) using the information in a user terminal, an engagement estimation technique is required, and there is currently no such technique.

Under the above-mentioned circumstances, an object of the present invention is to estimate engagement based on a parameter that can be observed in a terminal.

Means for Solving the Problem

To solve the above-mentioned problems, an engagement estimation apparatus includes an acquisition unit configured to acquire, for each of measurement sections after an instruction of a start of a view of an video delivered through a network, any of a parameter related to a coding quality of the video in the measurement section and a parameter related to a viewing state of the video in the measurement section, and an estimation unit configured to calculate an estimation value of an index for evaluation of engagement for each of the measurement section based on a parameter acquired by the acquisition unit in the measurement section.

Effects of the Invention

It is possible to estimate engagement based on a parameter that can be observed in a terminal.

DESCRIPTION OF EMBODIMENTS

Figure 1:
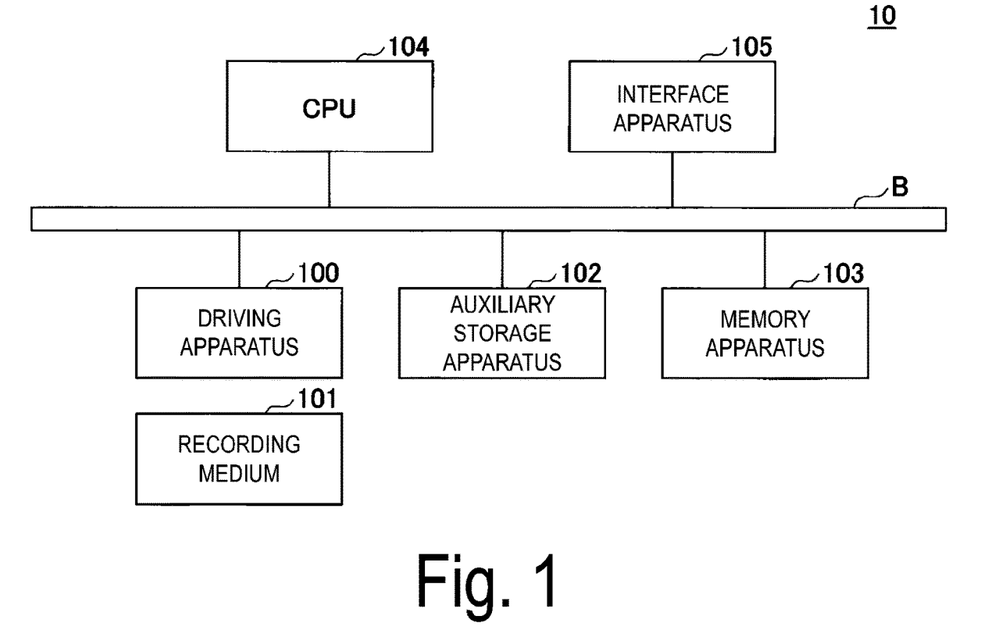
FIG. 1 is a drawing illustrating an example of a hardware configuration of an engagement estimation apparatus 10 of a first embodiment.

Embodiments of the present invention are described below with reference to the drawings. FIG. 1 is a drawing illustrating an example of a hardware configuration of an engagement estimation apparatus 10 of a first embodiment. The engagement estimation apparatus 10 of FIG. 1 includes a driving apparatus 100, an auxiliary storage apparatus 102, a memory apparatus 103, a CPU 104, an interface apparatus 105 and the like that are connected to one another through a bus B.

A program for implementing a process in the engagement estimation apparatus 10 is provided by a recording medium 101 such as a CD-ROM. When the recording medium 101 in which a program is stored is set in the driving apparatus 100, the program is installed to the auxiliary storage apparatus 102 from the recording medium 101 through the driving apparatus 100. It should be noted that installation of a program may not be performed from the recording medium 101, and may be downloaded from another computer through a network. The auxiliary storage apparatus 102 stores the installed program, and stores a required file, data and the like.

In response to an activation instruction of a program, the memory apparatus 103 reads the program from the auxiliary storage apparatus 102 and stores the program. The CPU 104 executes a function according to the engagement estimation apparatus 10 in accordance with a program stored in the memory apparatus 103. The interface apparatus 105 is used as an interface for network connection.

Figure 2:
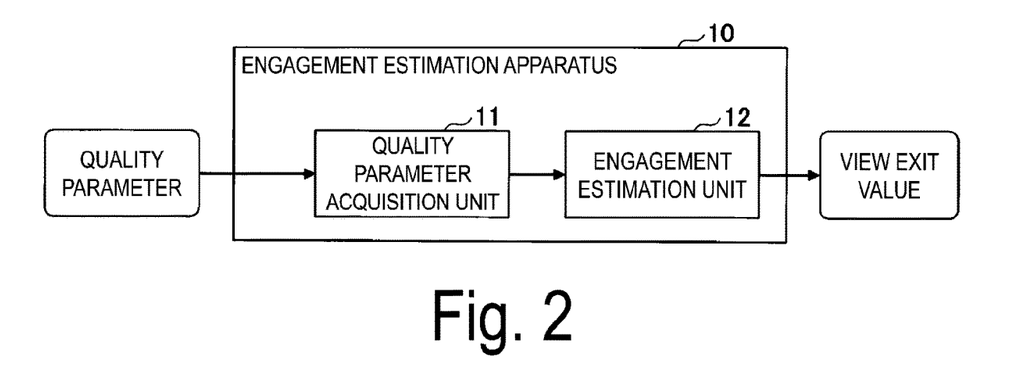
FIG. 2 is a drawing illustrating an example of a functional configuration of the engagement estimation apparatus 10 of the first embodiment.

FIG. 2 is a drawing illustrating an example of a functional configuration of the engagement estimation apparatus 10 of the first embodiment. In FIG. 2, the engagement estimation apparatus 10 includes a quality parameter acquisition unit 11, an engagement estimation unit 12 and the like to estimate engagement (view exit) that a viewer finally felt for adaptive bit rate video delivery performed through a network. These units are implemented by processes executed at the CPU 104 based on one or more programs installed in the engagement estimation apparatus 10. Specifically, these units are implemented by a cooperation of hardware resources of the engagement estimation apparatus 10 and programs (software) installed in the engagement estimation apparatus 10.

For example, when a start of a view of an video of adaptive bit rate video delivery is instructed, the quality parameter acquisition unit 11 acquires parameters (hereinafter collectively referred to as "quality parameter") related to the video viewing state such as the initial loading delay, the stalling length, and the video view duration in addition to parameters related to the coding quality such as the resolution, the frame rate, and the bit rate in the measurement section, from an application playing the video and the like for each measurement section set in advance, for example. The above-mentioned measurement section set in advance is, for example, a time unit such as one second, one minute, five minutes, and one hours, or a chunk/segment unit used for video delivery. It is to be noted that the video view duration is a time elapsed from input of a start instruction for a view of an video (for example, a press of a play button and the like). That is, the video view duration also includes an initial loading delay and a stalling length.

The engagement estimation unit 12 calculates an estimation value (hereinafter referred to as "view exit value") of an index for evaluation of the engagement in each measurement section based on the quality parameter acquired by the quality parameter acquisition unit 11 for each measurement section. In the present embodiment, the number of persons exited from the view (hereinafter referred to as "exited viewer") is set as the index. To be more specific, the view exit rate is described as an example of the view exit value. It should be noted that another index value, such as an video view duration at a time point of exit from the view, may be used as the view exit value.

It is to be noted that the engagement estimation apparatus 10 is, for example, a computer (hereinafter referred to as "viewer terminal") used for a view of adaptive bit rate video delivery. To be more specific, a smartphone, a tablet terminal, a personal computer (PC) and the like may be used as the engagement estimation apparatus 10.

Figure 3:
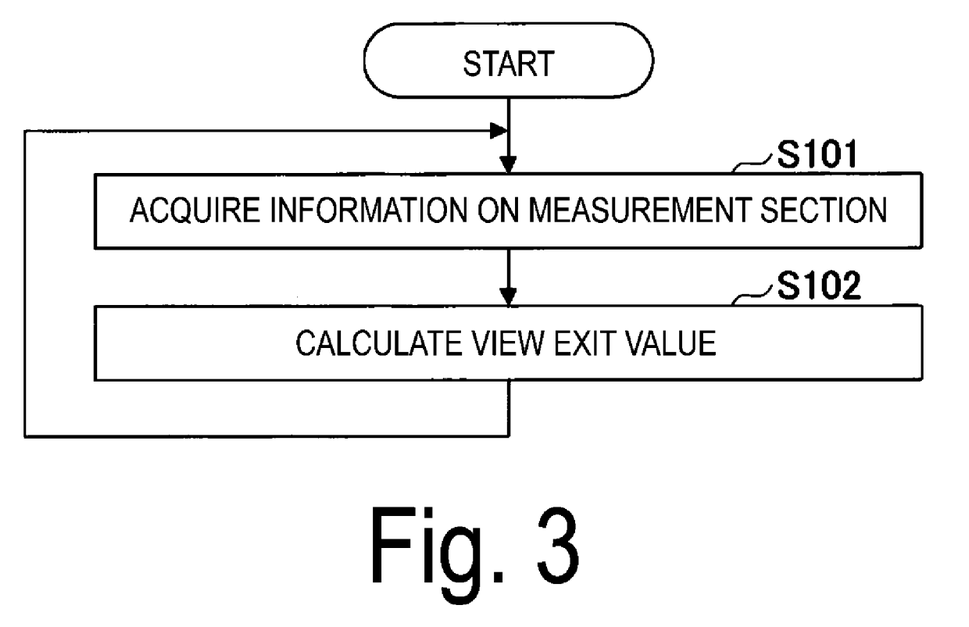
FIG. 3 is a flowchart for describing an example of a procedure of processes executed by the engagement estimation apparatus 10.

A procedure of processes executed by the engagement estimation apparatus 10 is described below. FIG. 3 is a flowchart for describing an example of a procedure of processes executed by the engagement estimation apparatus 10. The procedure of processes of FIG. 3 is started in response to a start of a view of an video of adaptive bit rate video delivery, for example.

At step S101, the quality parameter acquisition unit 11 acquires a quality parameter in an immediately preceding measurement section. Subsequently, the engagement estimation unit 12 calculates a view exit value in the measurement section based on the quality parameter (S102). Step S101 and S102 are repeated for each measurement section.

Details of step S102 are described below. In the first embodiment, the engagement estimation unit 12 calculates the view exit rate based on the initial loading delay (IDL) of the adaptive bit rate video delivery. The initial loading delay is set as a time period until sound/video media is played after a play button is pressed by a viewer and a viewer terminal accumulates data in a buffer before playing the sound/video media. In the first embodiment, the engagement estimation unit 12 derives, as a view exit rate D_IDL, a probability of exit from the video viewing due to playback that does not start easily. The derivation model of the view exit rate of the engagement estimation unit 12 of the first embodiment is a mathematical model with a property that the number of exited viewers (that is, the view exit rate DR_IDL) increases as the initial loading delay increases.

For example, the mathematical model is a linear function (DR_IDL=a+b×IDL), a logarithmic function (DR_IDL=a× ln (1+(b×IDL)), a step function and the like in which as the initial loading delay increases, the view exit rate DR_IDL monotonically increases. It should be noted that a and b are coefficients and are determined through an experiment and the like.

Specifically, in the first embodiment, at a time point of a start of a playback, the quality parameter acquisition unit 11 acquires an initial loading delay (IDL) up to the time point. The engagement estimation unit 12 puts the initial loading delay into the above-mentioned mathematical model to calculate the view exit rate DR_IDL, and terminates the process.

For example, assume that the measurement section is five seconds. Next, if the playback is started at the fifth second as in FIG. 4, the view exit rate DR_IDL due to the initial loading delay is calculated at the fifth second. Strictly speaking, for the initial loading delay, the view exit rate DR_IDL is calculated independently from the measurement section at the time point when the event is completed.

Next, a second embodiment is described. In the second embodiment points different from those of the first embodiment are described. The points that are not specifically mentioned in the second embodiment may be the same as those of the first embodiment.

In the second embodiment, the engagement estimation unit 12 derives the view exit rate DR_VT based on an video view duration (VT). As the video view duration is lengthened, the possibility that the viewer stops the view of the video during the view increases, and accordingly, the derivation model of the view exit rate of the engagement estimation unit 12 of the second embodiment is a mathematical model with a property that the number of exited viewers (that is, the view exit rate DR_VT) increases as the video view duration increases.

For example, the mathematical model is a linear function, an exponential function, a step function, and the like in which as the video view duration increases, the view exit rate DR_VT monotonically increases.

Specifically, in the second embodiment, the quality parameter acquisition unit 11 acquires the video view duration up to completion of each measurement section. In each measurement section, the engagement estimation unit 12 puts the video view duration into the above-mentioned mathematical model to calculate the view exit rate DR_VT. It should be noted that at a time point when the view of the video is stopped, the view exit rate DR_VT may be calculated based on the video view duration up to the time point.

Next, a third embodiment is described. In the third embodiment, points different from the above-mentioned embodiments are described. The points that are not specifically mentioned in the third embodiment may be the same as those of the above embodiments.

In the third embodiment, the engagement estimation unit 12 derives the view exit rate DR_Q based on coding quality Q of the video. When the coding quality Q of a sound/video per measurement section is reduced or when the accumulated coding quality Q indicates a tendency of degradation, degradation of the sound/video media being viewed is recognized, and it is determined that the media is not viewable. Accordingly, the derivation model of the view exit rate of the engagement estimation unit 12 of the third embodiment is a mathematical model with a property that the number of exited viewers (that is, the view exit rate DR_Q) increases in accordance with a reduction in the coding quality Q of sound/video per measurement section and/or a tendency of reduction of the accumulated coding quality Q.

For example, the mathematical model is a linear function (DR_Q=a−b×Q), a logarithmic function (DR_Q=a−b×ln (c×Q)), a step function and the like in which the view exit rate DR_Q monotonically increases as the sound/video quality is reduced. It should be noted that a and b are coefficients. That is, this mathematical model means derivation of the view exit rate DR_Q with a monotone increasing function with the coding quality Q as an input.

For example, with the quality estimation model defined in the recommendation P.1203 of NPTL 1 and/or NPTL 2, the sound quality per unit time, the video quality per unit time, the audio visual quality per unit time, and the audio visual quality in a time elapsed after a start of a view may be used as the coding quality Q. A derivation method for the sound quality per unit time is defined in the recommendation P.1203.2. A derivation method for the video quality per unit time is defined in the recommendation P.1203.1. A derivation method for the video quality per unit time is defined in the recommendation P.1203.1. A derivation method for the audio visual quality per unit time is defined in the recommendation P.1203.3. A derivation method for the audio visual quality in a time elapsed after a start of a view is defined in the recommendation P.1203.3. Alternatively, the coding quality Q may be calculated using other publicly known methods such as the method disclosed in WO2017/104416 and the like.

Specifically, in the third embodiment, the quality parameter acquisition unit 11 acquires parameters (such as the resolution, the frame rate, and the bit rate) for calculating the coding quality Q in an immediately preceding measurement section to calculate the coding quality Q based on the parameters. The engagement estimation unit 12 puts the coding quality Q into the above-mentioned mathematical model to calculate the view exit rate DR_Q in the measurement section.

Next, a fourth embodiment is described. In the fourth embodiment, points different from the above-mentioned embodiments are described. The points that are not specifically mentioned in the fourth embodiment may be the same as those of the above embodiments.

In the fourth embodiment, the engagement estimation unit 12 derives the view exit rate DR_SL based on a stalling length (SL). When data accumulated in the buffer of the viewer terminal is exhausted, stalling of sound/video media occurs. The derivation model of the view exit rate of the engagement estimation unit 12 of the fourth embodiment is a mathematical model with a property that the number of exited viewers (that is, the view exit rate DR_SL) increases as the stalling length (SL) increases.

For example, the mathematical model is a linear function (DR_SL=a+b×SL), a logarithmic function (DR_SL=a×ln (1+(b×SL))), a step function and the like in which the view exit rate DR_SL monotonically increases as the stalling length increases. It should be noted that a and b are coefficients.

Specifically, in the fourth embodiment, at a time point of a start (restart) of a playback, the quality parameter acquisition unit 11 acquires the stalling length for one time up to the time point. The engagement estimation unit 12 puts the stalling length into the above-mentioned mathematical model to calculate the view exit rate DR_SL in the measurement section.

Figure 5:
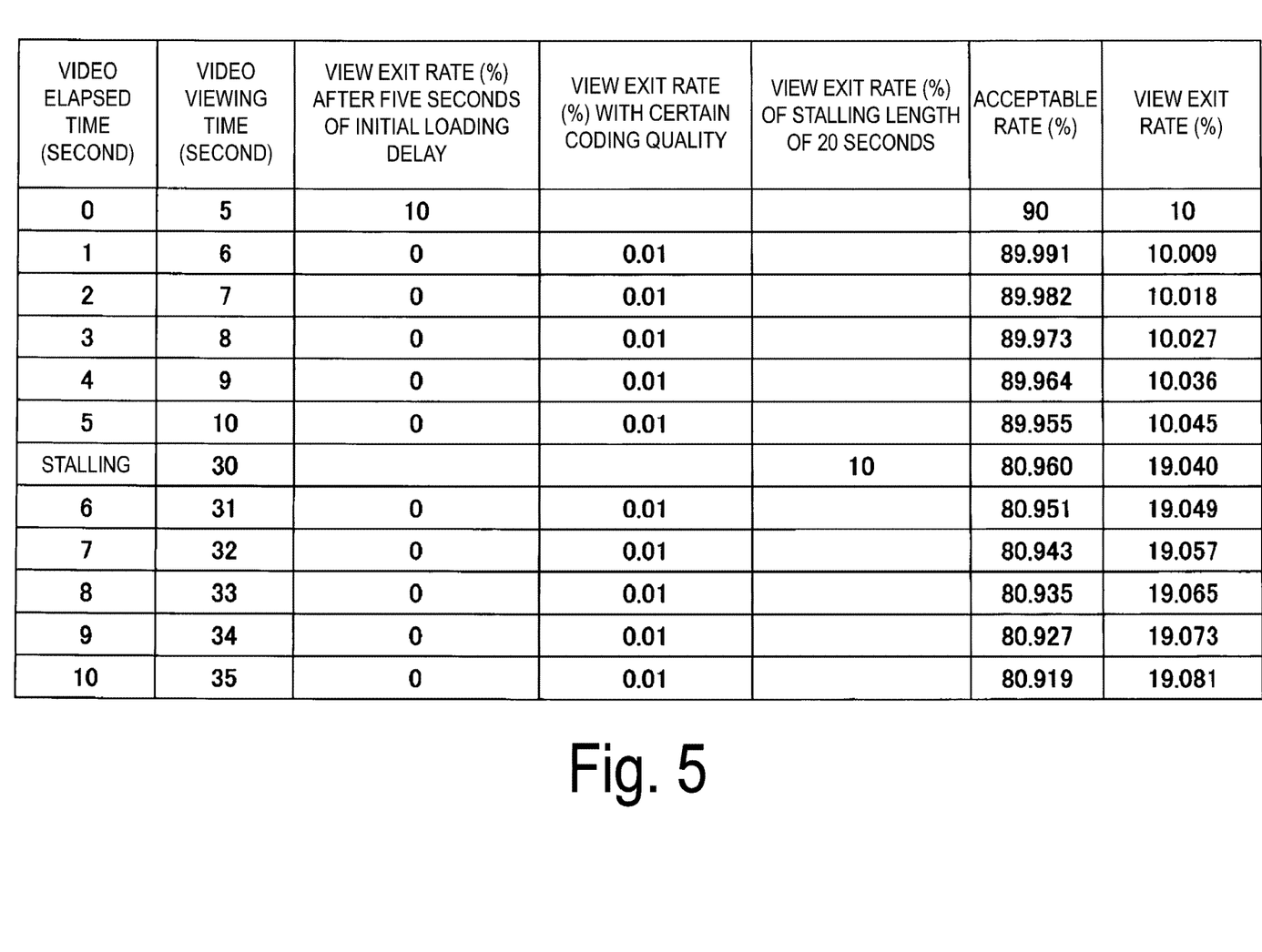
FIG. 5 illustrates an example of a view exit rate in each measurement section in a seventh embodiment.

For example, assume that the measurement section is five seconds. Next, when stalling occurs for 20 seconds at the 10th second as illustrated in FIG. 5, the view exit rate DR_SL due to the stalling is calculated at the 30th second. Strictly speaking, for the stalling length, the view exit rate DR_SL is calculated independently from the measurement section at the time point when the event is completed.

Next, a fifth embodiment is described. In the fifth embodiment, points different from the above-mentioned embodiments are described. The points that are not specifically mentioned in the fifth embodiment may be the same as those of the above embodiments.

In the fifth embodiment, the first and second embodiments are combined together. Any adaptive bit rate video delivery entails initial loading delay although it may be short (for example, several seconds). On the other hand, when the resolution is 4K (3840×2160 pixels) or HD (1920×1080 pixels), the frame rate is sufficiently high (60 fps or 30 fps), and the bit rate is sufficiently high (several tens of Mbps or the like), substantially no degradation of the coding quality is recognized. For this reason, in the fifth embodiment, the view exit rate DR_IDL due to the initial loading delay and the view exit rate DR_VT due to the video view duration are taken into consideration.

For example, assume that, at step S102 in a certain measurement section, the initial loading delay is five seconds, and the engagement estimation unit 12 calculates the view exit rate DR_IDL based on the five seconds as 10%. In this case, the engagement estimation unit 12 multiplies the remaining 90% by the view exit rate DR_VT due to the video view duration to calculate the view exit rate of the measurement section. Specifically, in each measurement section, the engagement estimation unit 12 adds the view exit rate DR_VT due to the video view duration to a value obtained by subtracting the view exit rate DR_IDL due to the initial loading delay from 100%, or multiplies the value by the view exit rate DR_VT due to the video view duration, to calculate the view exit rate of a given time (each measurement section).

Next, a sixth embodiment is described. In the sixth embodiment, points different from the above-mentioned embodiments are described. The points that are not specifically mentioned in the sixth embodiment may be the same as those of the above embodiments.

In the sixth embodiment, the first to third embodiments are combined together. The fifth embodiment describes a case where degradation due to the coding quality is significantly small and there is no view exit rate due to the coding degradation. When the bit rate is not sufficiently high, however, degradation of the coding quality can be recognized and the view exit due to degradation of the coding quality occurs.

Figure 4:
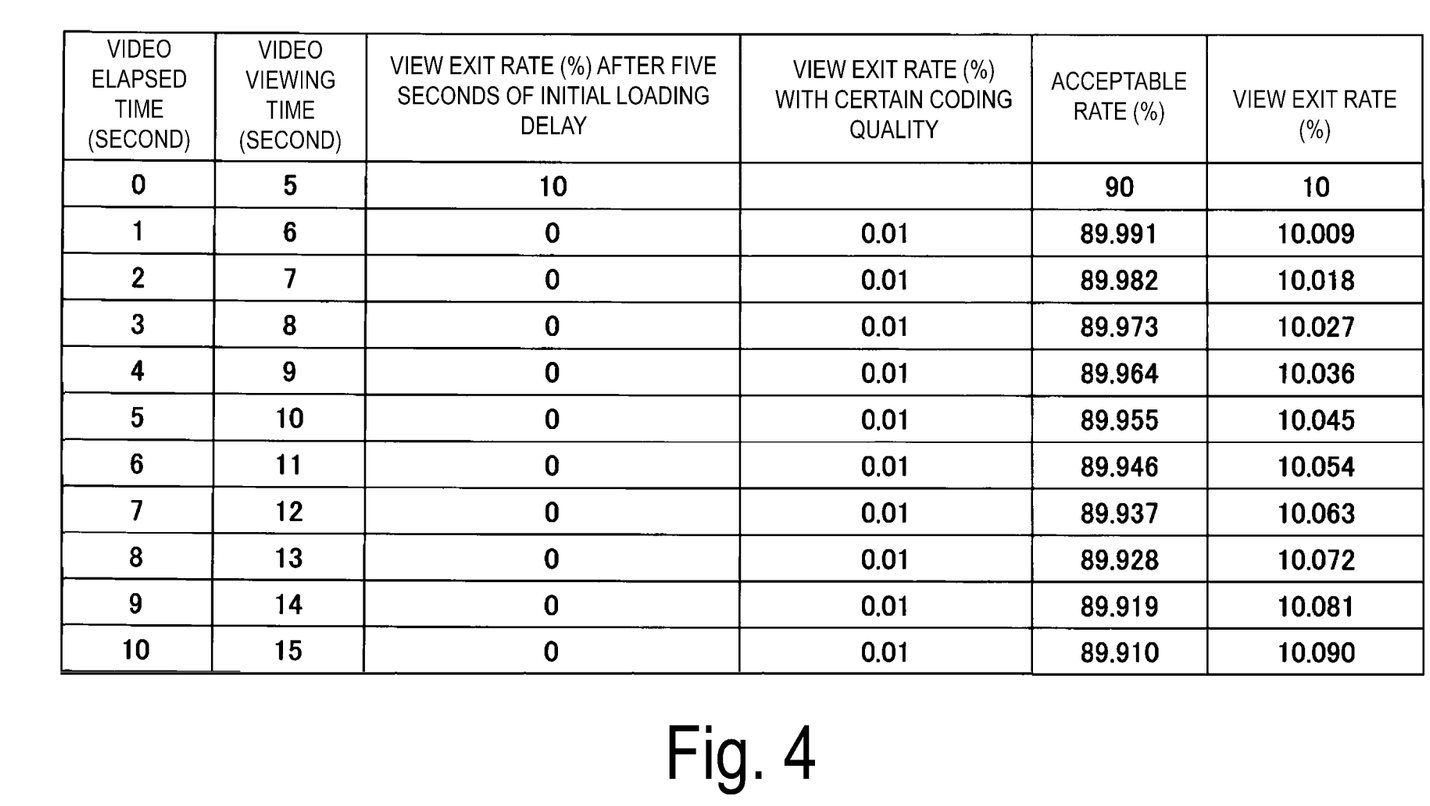
FIG. 4 illustrates an example of a view exit rate in each measurement section in a sixth embodiment.

Assume that, based on the third embodiment, the relationship between the view exit rate DR_Q and the coding quality Q per measurement section (for example, the coding quality Q per second) is formulated by a mathematical model (in such a manner that the view exit rate DR_Q of a certain coding quality Q is 0.01%, or the like). Assume that, in such a case, the initial loading delay is five seconds and the engagement estimation unit 12 calculates the view exit rate DR_IDL based on the initial loading delay of five seconds as 10% in the measurement section of an video view duration of five seconds (here, the measurement section is provided in a unit of one second). In this case, when the view exit rate DR_Q based on the quality Q of each measurement section subsequent to the sixth second of the video view duration is 0.01%, the view exit rate of the video view duration of six seconds is calculated as 10.009% (100−acceptable rate (a value obtained by subtracting 0.9×0.01% from 90%)). As a result, in this case, the view exit rate of each measurement section is as illustrated in FIG. 4. It is to be noted that in FIG. 4, the video elapsed time is a time indicating a playback position of the video.

Next, a seventh embodiment is described. In the seventh embodiment, the points that are different from those of the above embodiments are described. The points that are not specifically mentioned in the seventh embodiment may be the same as those of the above embodiments.

In the seventh embodiment, the first to fourth embodiments are combined together.

Assume that, in the state of the sixth embodiment, stalling (for example, 20 seconds) has occurred after a certain video view duration (for example, five seconds). In this case, the engagement estimation unit 12 calculates the view exit rate DR_SL based on the 20 seconds. When the view exit rate DR_SL is 10%, the engagement estimation unit 12 sets the sum of a value obtained by multiplying the acceptable rate of the video view duration of five seconds (89.955) by 10% and the view exit rate of the video view duration of five seconds, as the view exit rate (19.040) after stalling of 20 seconds. In this case, the view exit rate of each measurement section is as illustrated in FIG. 5.

As described in the fifth to seventh embodiments, the view exit rate DR(t) per unit time can be derived from the immediately preceding view exit rate DR(t−1), the view exit rate DR_IDL due to the initial loading delay (first embodiment), the view exit rate DR_VT due to the video view duration (second embodiment), the view exit rate DR_Q due to the coding quality (third embodiment), and the view exit rate DR_SL due to stalling length (fourth embodiment).

In practice, multiple quality degradations can occur at the same time, and for such a case, the fifth to seventh embodiments are especially effective. It is to be noted that any combination of the first to fourth embodiments may be implemented. For example, a combination of the embodiments except for the first embodiment may be implemented.

It is to be noted that the equations and the derivation procedures in the first to seventh embodiments are merely examples and are not limitative as long as the equations and the derivation procedures can take the above-mentioned properties into consideration. For example, the following equation may be adopted in consideration of the first to fourth embodiments. It should be noted that a, b, c, d, e and f are coefficients.

$$DR(t)=a \times SL+b \times VT+c+Q \times DR(t-1)(e-f \times VT)$$

As described above, according to the embodiments, the engagement can be estimated based on parameters that can be observed in a terminal, such as the resolution, the frame rate, the bit rate, the initial loading delay, the stalling length, and the video view duration.

As a result, for example, by monitoring the engagement value of a communication service actually viewed by a viewer, whether the service being provided maintains engagement of a certain level or greater for the viewer can be easily determined, and the actual engagement of the service being provided can be determined and managed in real time.

It is to be noted that in the embodiments, the quality parameter acquisition unit 11 is an example of an acquisition unit. The engagement estimation unit 12 is an example of an estimation unit.

Although the embodiments of the present invention have been described above in detail, the present disclosure is not limited to such specific embodiments, and various modifications or changes can be made within the scope of the gist of the present disclosure described in the claims.

REFERENCE SIGNS LIST

10 Engagement estimation apparatus
11 Quality parameter acquisition unit
12 Engagement estimation unit p
100 Driving apparatus
101 Recording medium
102 Auxiliary storage apparatus
103 Memory apparatus
104 CPU
105 Interface apparatus
B Bus

The invention claimed is:

1. An engagement estimation apparatus comprising:
an acquisition unit, including one or more processors, configured to acquire, for each of measurement sections after an instruction of a start of a view of an video delivered through a network, any of a parameter related to a coding quality of the video in the measurement section and a parameter related to a viewing state of the video in the measurement section, wherein the acquisition unit is configured to acquire an initial loading delay; and
an estimation unit, including one or more processors, configured to calculate an estimation value of an index for evaluation of engagement for each of the measurement sections based on a parameter acquired by the acquisition unit in the measurement section, wherein the estimation unit is configured to calculate the estimation value based on a mathematical model with a property that a number of existed viewers increases as the initial loading delay increases.

2. The engagement estimation apparatus according to claim 1, wherein
the acquisition unit is configured to acquire an video view duration; and
the estimation unit is configured to calculate the estimation value based on a mathematical model with a property that a number of exited viewers increases as the video view duration increases.

3. The engagement estimation apparatus according to claim 1, wherein
the acquisition unit is configured to acquire a parameter related to the coding quality; and
the estimation unit is configured to calculate the estimation value based on a mathematical model with a property that a number of exited viewers increases as the coding quality is reduced.

4. The engagement estimation apparatus according to claim 1, wherein
the acquisition unit is configured to acquire a stalling length; and
the estimation unit is configured to calculate the estimation value based on a mathematical model with a property that a number of exited viewers increases as the stalling length increases.

5. An engagement estimation method including, at a computer:
an acquisition procedure of acquiring, for each of measurement sections after an instruction of a start of a view of an video delivered through a network, any of a parameter related to a coding quality of the video in the measurement section and a parameter related to a viewing state of the video in the measurement section, wherein the acquisition procedure comprises acquiring an initial loading delay; and
an estimation procedure of calculating an estimation value of an index for evaluation of engagement for each of the measurement sections based on a parameter acquired by the acquiring in the measurement section, wherein the estimation procedure comprises calculating the estimation value based on a mathematical model with a property that a number of exited viewers increases as the initial loading delay increases.

6. A non-transitory computer readable medium storing one or more instructions configured to cause a computer to execute:
an acquisition procedure of acquiring, for each of measurement sections after an instruction of a start of a view of an video delivered through a network, any of a parameter related to a coding quality of the video in the measurement section and a parameter related to a viewing state of the video in the measurement section, wherein the acquisition procedure comprises acquiring an initial loading delay; and
an estimation procedure of calculating an estimation value of an index for evaluation of engagement for each of the measurement sections based on a parameter acquired by the acquiring in the measurement section, wherein the estimation procedure comprises calculating the estimation value based on a mathematical model with a property that a number of exited viewers increases as the initial loading delay increases.

7. The engagement estimation method according to claim 5, wherein
the acquisition procedure comprises acquiring an video view duration; and
the estimation procedure comprises calculating the estimation value based on a mathematical model with a property that a number of exited viewers increases as the video view duration increases.

8. The engagement estimation method according to claim 5, wherein
the acquisition procedure comprises acquiring a parameter related to the coding quality; and
the estimation procedure comprises calculating the estimation value based on a mathematical model with a property that a number of exited viewers increases as the coding quality is reduced.

9. The engagement estimation method according to claim 5, wherein
the acquisition procedure comprises acquiring a stalling length; and
the estimation procedure comprises calculating the estimation value based on a mathematical model with a property that a number of exited viewers increases as the stalling length increases.

10. The non-transitory computer readable medium according to claim 6, wherein
the acquisition procedure comprises acquiring an video view duration; and
the estimation procedure comprises calculating the estimation value based on a mathematical model with a property that a number of exited viewers increases as the video view duration increases.

11. The non-transitory computer readable medium according to claim 6, wherein
the acquisition procedure comprises acquiring a parameter related to the coding quality; and
the estimation procedure comprises calculating the estimation value based on a mathematical model with a property that a number of exited viewers increases as the coding quality is reduced.

12. The non-transitory computer readable medium according to claim 6, wherein
the acquisition procedure comprises acquiring a stalling length; and
the estimation procedure comprises calculating the estimation value based on a mathematical model with a property that a number of exited viewers increases as the stalling length increases.

* * * * *